UNITED STATES PATENT OFFICE.

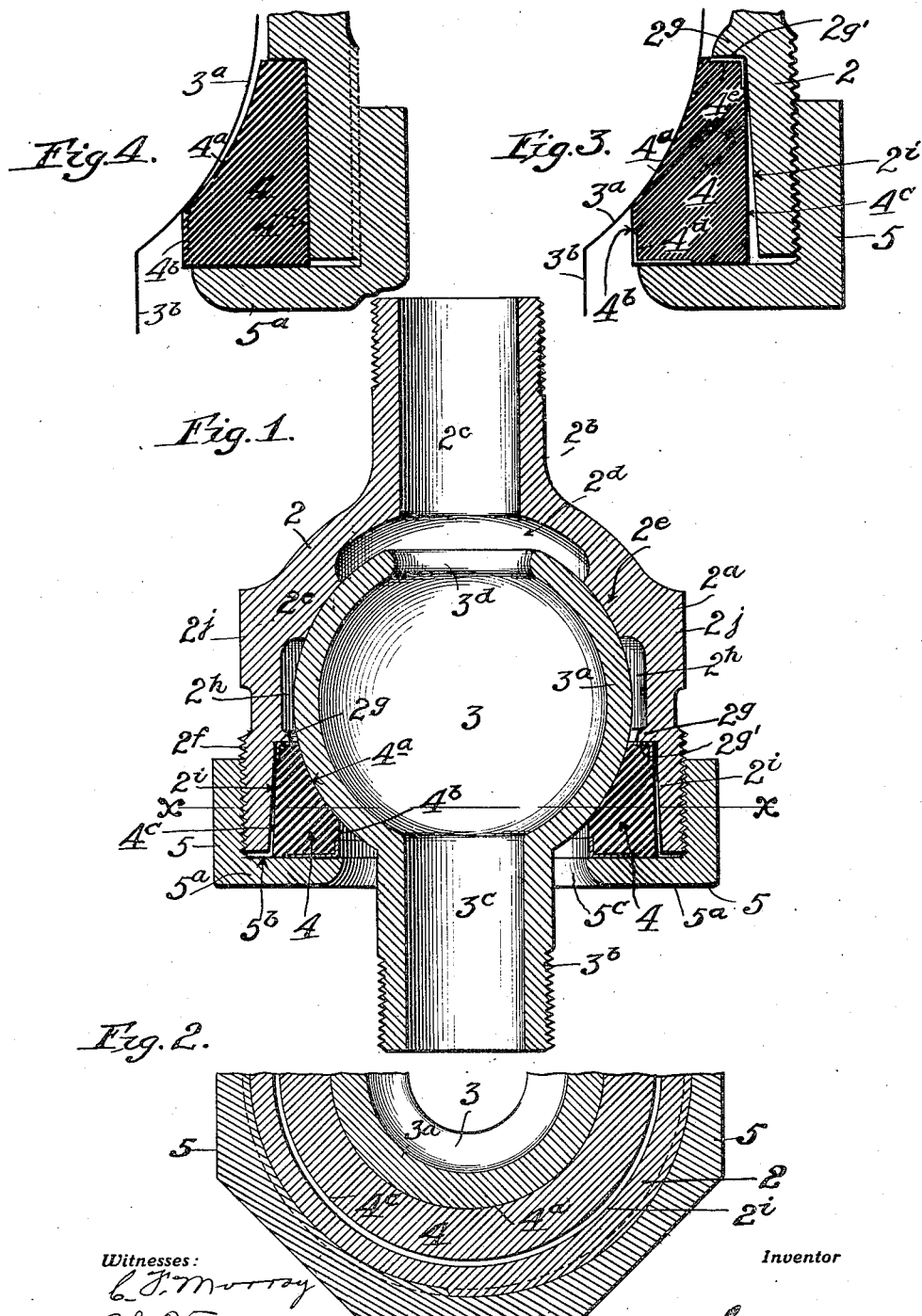

CHARLES GILBERT HAWLEY, OF CHICAGO, ILLINOIS, ASSIGNOR, BY MESNE ASSIGNMENTS, TO THE UNITED STATES FLEXIBLE JOINT COMPANY, OF CHICAGO, ILLINOIS, A CORPORATION OF SOUTH DAKOTA.

FLEXIBLE FLUID-JOINT.

No. 848,169.     Specification of Letters Patent.     Patented March 26, 1907.

Application filed May 6, 1905. Serial No. 259,189.

*To all whom it may concern:*

Be it known that I, CHARLES G. HAWLEY, a citizen of the United States, and a resident of Chicago, Cook county, Illinois, have invented a certain new, useful, and Improved Flexible Fluid-Joint, of which the following is a full, clear, and exact description, such as will enable others skilled in the art to which it appertains to make and use the same.

My invention relates to flexible joints for various fluids, and particularly for steam.

The invention has special reference to improvements in ball-and-socket flexible or universal conduit-joints.

The object of the invention is to provide a simple and efficient flexible joint for steam, water, and other pipes or conduits; and the particular object of the invention is to provide a flexible ball-and-socket joint that will maintain itself in a tight condition for a great length of time and which will be of such construction that its joints shall be practically unaffected by the expansion and contraction of the parts which compose the flexible joint or coupling.

A further and particular object of the invention is to provide a ball-and-socket joint of the class described wherein the ball member of the joint or coupling shall be held between a metallic surface and a non-metallic surface and in which the non-metallic bearing of said ball member shall be a composition gasket of such construction and so held that its expansion and contraction will not vary or change the shape of the socket-surface of the gasket.

Other objects of the invention will appear hereinafter.

My invention consists generally in a ball-and-socket fluid-joint comprising ball-and-socket members having internal ducts or passages and fitted to each other, in combination with a non-metallic gasket furnishing a socket for the ball member of the joint, and said socket member of the joint being provided with a gasket space or recess of such form that the gasket is held against either longitudinal or transverse movement and yet is rendered capable of lateral and peripheral expansion, whereby the distortion of the socket-surface of the gasket by heat is prevented.

Further, my invention consists in various details of construction and in combinations of parts, all as hereinafter described, and particularly pointed out in the claims.

My invention will be more readily understood by reference to the accompanying drawings, forming a part of this specification, and in which—

Figure 1 is a longitudinal sectional view of my novel flexible ball-and-socket joint or coupling for fluid-conduits. Fig. 2 is a partial transverse section on the line $xx$ of Fig. 1. Fig. 3 is an enlarged sectional detail of the gasket and portions of the socket and ball members of the joint, and Fig. 4 is a comparative view similar to Fig. 3, here employed for the purpose of illustrating the common arrangement of the gasket and also the detrimental effects of the expansion of said gasket.

The preferred form or embodiment of my invention, which is shown in the drawings, comprises the socket member 2, the ball member 3, and the non-metallic gasket 4. The ball member 3 comprises the ball portion $3^a$ and the shank or reduced portion $3^b$. The ball member contains a duct $3^c$, which is enlarged within the ball portion, having an opening $3^d$ at its inner end. The shank $3^b$ is externally or internally threaded to receive the end of the steam or other pipe with which the joint is used. The socket member 2 comprises the body portion $2^a$ and the nipple or reduced portion $2^b$, threaded, as in the case of the ball member. The socket member contains a duct $2^c$, which is enlarged within the body of the member 2 to receive the ball $3^a$. The upper or outer portion of the duct-cavity $2^d$ is provided with an annular projection $2^e$, the surface of which is turned or ground to fit the ball $3^a$. The lower or inner end of the socket member is provided with a thread $2^f$ to receive the union-ring 5, having a flange $5^a$, which serves as a follower for the gasket 4. Upon the inner cylindrical wall of the socket member I provide an annular rib $2^g$, leaving an annular space $2^h$ about the ball $3^a$ and between the annular projections $2^e$ and $2^g$. The inner surface or edge of the rib $2^g$ is set at a considerable distance from the surface of the ball to avoid contact therewith. In the lower end of the socket member I provide a tapered recess or gasket-socket $2^i$, which will be more particularly described hereinafter. The gasket 4 is placed in the gasket-socket $2^i$ and is then followed by the ring 5, which is screwed upon the socket member until the gasket has been firmly bound between the lower or inner surface $2^{g'}$ of the rib $2^g$ and the inner surface $5^b$ of the follower-ring 5. The follower-ring contains an opening $5^c$ of greater diameter than the nipple or neck of the ball member. This is also true of the gasket, the smallest internal diameter of which substantially equals the diameter of the opening in the follower-ring. It will be obvious that the ball, though tightly held between the metallic socket-surface $2^e$ and the non-metallic socket-surface afforded by the gasket 4, may rotate or oscillate within the socket member. The degree of movement permitted the ball depends upon the relative sizes of the ball-nipple and the openings in the gasket and follower. The socket member is provided with a polygonal portion $2^j$, and the follower is polygonal also, so that wrenches may be applied to turn the parts and hold the annular gasket firmly between the surfaces $2^g$ and $5^b$ of the socket member and the follower. The gasket is depended upon to form the tight joint between the members, and the annular portion $2^e$ of the socket member need perform only the office of a stop to prevent excessive longitudinal movement of the ball within the socket. The ball is constantly pressed outward, the internal pressure of steam or other fluid tending to separate the parts of the joint or coupling. It will be seen, therefore, that when the gasket becomes somewhat worn the ball will recede from the metallic socket-surface $2^e$, leaving a space between the parts, and the purpose of the annular groove or channel $2^h$ in the cylindrical portion of the socket member is to receive and collect any sediment or dirt which lodges in the coupling. By thus allowing ample space for the deposit of sediment and dirt I prevent its working down between the ball and the gasket. In this connection it should be noted that the metal parts do not make contact adjacent to the gasket portion, and even when the gasket has been practically worn out there is no metal part to prevent the ball from setting firmly upon the gasket whenever fluid is admitted to the joint or coupling. A further advantage of the rib $2^g$ and annular groove $2^h$ lies in the fact that the walls of the socket member need not be finished and may be left rough. Considerable expense in the manufacture of the joint is thus avoided.

The gasket 4, having the concave surface $4^a$, which provides a socket for the ball 3, is of ordinary shape—that is, the ball cavity or socket $4^a$ is formed in the usual manner and the internal and external cylindrical surfaces $4^b$ and $4^c$ are of usual form and extent. The ends of the ring are flat to engage the shoulder $2^{g'}$ and the inner surface $5^b$ of ring 5. Normally—that is, when the ring is cool—the external diameter of the gasket is uniform throughout the length of the gasket, the periphery thereof conforming to a true cylinder. It will be noted that the gasket is of less thickness at its upper or inner end than at its lower end and that the inner end of the gasket is of a size to snugly fit the inner end or base of the tapered gasket-socket $2^i$. I prefer to strengthen and protect the ends of the gasket-rings by means of armor-rings $4^d$ and $4^e$, the latter being new and employed to prevent the crushing of the gasket through pressure against the shoulder $2^g$ of the socket member. The gasket is made of non-metallic material, such as a hard-rubber composition, the material being soft as compared with the metal composing the rest of the socket, though not flexible or elastic in the ordinary sense of these terms.

My ball-and-socket coupling is particularly intended for joining steam and hot-water pipes and in common with other joints of the class is subjected to high temperature. The non-metallic material composing the ring is much affected by heat, heat having a tendency to considerably expand the gasket. In ordinary joints this expansion operates to prevent the proper contact between the ball and the gasket. How this occurs is illustrated in Fig. 4, showing a gasket and socket member of the usual form and arrrangement. As therein shown, the gasket 4 snugly fits the cylindrical recess in the socket member of the coupling or joint, and the gasket is firmly bound between the socket-shoulder and the follower-ring. The line $3^a$ $3^b$ represents the ball member, which should make contact with all parts of the socket-surface $4^a$ of the gasket. Instead when the gasket is expanded by heat the gasket-socket is distorted in such manner that the contact between the gasket and the ball member is reduced to practically a single line, the ball member being relatively lifted, so that there is a space between the upper or inner portion of the gasket and the adjacent ball-surfaces. This is clearly shown in Fig. 4 and is due to the fact that the gasket, being held against peripheral expansion, necessarily constricts or expands inwardly. The effect of this expansion upon the gasket itself is indicated by the full lines $4^a$ $4^b$ and the corresponding dotted lines, the latter representing the surface when the gasket is cool. It will be understood that even a single line of contact between the ball and the socket-gasket would under favorable conditions insure a tight joint; but it will be readily seen that the space which I have described as existing between the upper portion of the socket and the ball when the coupling is heated will soon receive particles of sediment and grit. A packing which is limited to a single line of contact is not dependable from a practical standpoint, and, furthermore, the grit which collects between the ball and the socket soon destroys the contacting surfaces, causing the joint to leak. As contrasted with the construction illustrated in Fig. 4 and the objectionable consequences recited reference may now be made to Fig. 3, in which I have illustrated the gasket 4 as it appears in a cooled condition. The gasket 4 fits the tapered socket $2^i$ at the inner end; but the outer end of the socket is considerably larger than the normal size of the gasket, a tapered or thin space remaining between the periphery of the gasket and the wall of the gasket-socket. Now when this gasket so held is expanded by heat its unyielding boundaries will be the ball 3 and the surfaces $2^g$ and $5^b$ of the socket member. In other words, the gasket may expand peripherally, which expansion will not alter the shape of the socket-surface of the gasket. The lateral expansion of the gasket will be proportional to its thickness in different parts, and when expanded it will present the appearance illustrated in Fig. 1, the gasket at such time being tapered and substantially filling the tapered socket. It should be observed that the gasket is held against bodily lateral movement within the socket member, for the reason that the gasket engages the tapered gasket-socket at the inner end. In this manner the concentricity of the gasket is insured and objectionable wear is prevented.

It is obvious that modifications of the invention will readily suggest themselves to one skilled in the art, and I therefore do not confine the invention to the specific constructions herein set forth and described.

Having thus described my invention, I claim as new and desire to secure by Letters Patent—

1. A ball-and-socket joint of the class described, comprising ball-and-socket members, the latter having a follower and being provided with a tapered gasket recess or socket, in combination with a non-metallic gasket that is normally cylindrical, said gasket occupying said tapered socket and providing a socket or bearing for said ball, substantially as described.

2. The combination, in a ball-and-socket joint of the class described, of a ball member with a socket member, a follower upon said socket member, said socket member having a tapered gasket socket or recess terminating in a shoulder, and a non-metallic normally cylindrical gasket held between said follower and said shoulder and fitting the inner end of said gasket-recess, substantially as described.

3. In a ball-and-socket joint of the class described, a ball member, in combination with a socket member having a ball-follower and provided with a tapered gasket recess or socket, a non-metallic normally cylindrical gasket arranged in said tapered socket and adapted to expand therein when heated, said gasket being provided with a socket-surface fitting the ball of said ball member, substantially as described.

4. In a ball-and-socket joint of the class described, a socket member provided with an internal rib or shoulder, $2^e$, and a groove, $2^h$, in combination with a ball member adapted to engage said rib, $2^e$, a follower upon said socket member, said socket member having an internal rib, $2^h$ and a gasket-socket, a gasket arranged in said socket and having a socket-surface engaging said ball member, substantially as described.

5. In a ball-and-socket joint of the class described, a socket member, provided with internal ribs, $2^e$, and $2^g$, and internal grooves or recesses, $2^h$ and $2^i$, the latter being tapered as described, in combination with a ball member having a ball portion within the socket member, a follower upon said socket member and a normally cylindrical gasket, 4, fitting the tapered recess of the socket member at its one end and having a socket-surface, $4^a$, which fits the ball portion of said ball member, substantially as described.

6. In a ball-and-socket joint of the class described, a ball member having a ball portion, $3^a$, in combination with a socket member having an internal rib, $2^e$, to fit the inner portion of said ball member, said socket member also having a sediment-collecting groove, $2^h$ and an internal rib, $2^g$, a socket-gasket arranged in the outer end of said socket member, and gasket-holding means upon said socket member, substantially as described.

7. In a ball-and-socket joint of the class described, a socket member provided with a gasket-socket of greatest diameter at its outer end, in combination with a non-metallic gasket having an armored inner end to fit the inner end of said gasket-socket, the outer end of said gasket being normally of less diameter than the outer end of said gasket-socket, a gasket-follower upon said socket member, and a ball member contained within the socket member and seated in said gasket, substantially as described.

In testimony whereof I have hereunto set my hand, this 4th day of April, 1905, at Chicago, county of Cook, and State of Illinois, in the presence of two subscribing witnesses.

CHARLES GILBERT HAWLEY.

Witnesses:
EDWARD E. SILK,
JOHN R. LEFEVRE.